United States Patent
Schill et al.

(10) Patent No.: US 11,945,654 B2
(45) Date of Patent: Apr. 2, 2024

(54) GRAIN CONVEYOR CHAIN

(71) Applicant: iwis antriebssysteme Gmbh & Co. KG, Munich (DE)

(72) Inventors: Eric Schill, Niederdorla (DE); Jaymin Patel, Karlsfeld (DE)

(*) Notice: Subject to any disclaimer, the term of this patent is extended or adjusted under 35 U.S.C. 154(b) by 0 days.

(21) Appl. No.: 17/741,506

(22) Filed: May 11, 2022

(65) Prior Publication Data

US 2022/0363483 A1 Nov. 17, 2022

(30) Foreign Application Priority Data

May 12, 2021 (DE) .................... 10 2021 112 495.6

(51) Int. Cl.
| | | |
|---|---|---|
| B65G 19/08 | (2006.01) | |
| B65G 17/44 | (2006.01) | |
| B65G 19/24 | (2006.01) | |

(52) U.S. Cl.
CPC ............ B65G 19/08 (2013.01); B65G 17/44 (2013.01); B65G 19/24 (2013.01)

(58) Field of Classification Search
CPC ... A01F 12/46; B65G 2201/042; B65G 19/24; B65G 17/42; B65G 17/44; B65G 17/126; B65G 17/123; B65G 17/14; B65G 17/36; A01D 61/04
USPC ........................................ 198/801, 716, 711
See application file for complete search history.

(56) References Cited

U.S. PATENT DOCUMENTS

| | | | | |
|---|---|---|---|---|
| 5,165,522 A | * | 11/1992 | Uttke ..................... | B65G 19/22 198/731 |
| 5,341,919 A | * | 8/1994 | Mizuno .................. | B65G 19/14 198/716 |
| 6,138,518 A | * | 10/2000 | Strubbe ................... | G01F 1/206 73/861.73 |
| 7,377,378 B2 | * | 5/2008 | Cash, III ............... | B65G 17/26 198/803.11 |
| 10,131,501 B1 | * | 11/2018 | Kopf ....................... | A01F 12/46 |
| 10,462,973 B2 | | 11/2019 | Dilts | |
| 10,822,180 B2 | * | 11/2020 | Binford .................. | B65G 19/24 |
| 2018/0334329 A1 | | 11/2018 | Kopf | |
| 2018/0359927 A1 | * | 12/2018 | Dilts ....................... | A01F 12/46 |

FOREIGN PATENT DOCUMENTS

| | | | | |
|---|---|---|---|---|
| DE | 202014010472 | | 7/2014 | |
| DE | 202014010472 U1 | * | 12/2015 | .......... A01D 45/023 |
| DE | 102017111719 | | 3/2018 | |
| DE | 102017111719 A1 | * | 3/2018 | ............ B65G 17/44 |
| DE | 102018124851 | | 4/2020 | |
| EP | 1298077 A2 | * | 4/2003 | ............ A01F 12/46 |

* cited by examiner

*Primary Examiner* — Mark A Deuble
(74) *Attorney, Agent, or Firm* — JMB DAVIS BEN-DAVID

(57) ABSTRACT

The invention relates to a grain conveyor chain for a harvesting vehicle having a chain made of standard chain elements, wherein the standard chain elements comprise inner plates, outer plates, pins and/or sleeves, and a plurality of scoops, wherein the scoops are fastened on the chain and wherein the chain has chain links, which are partially back-rigid, and to a method for operating the grain conveyor chain according to the invention in a harvesting vehicle.

16 Claims, 9 Drawing Sheets

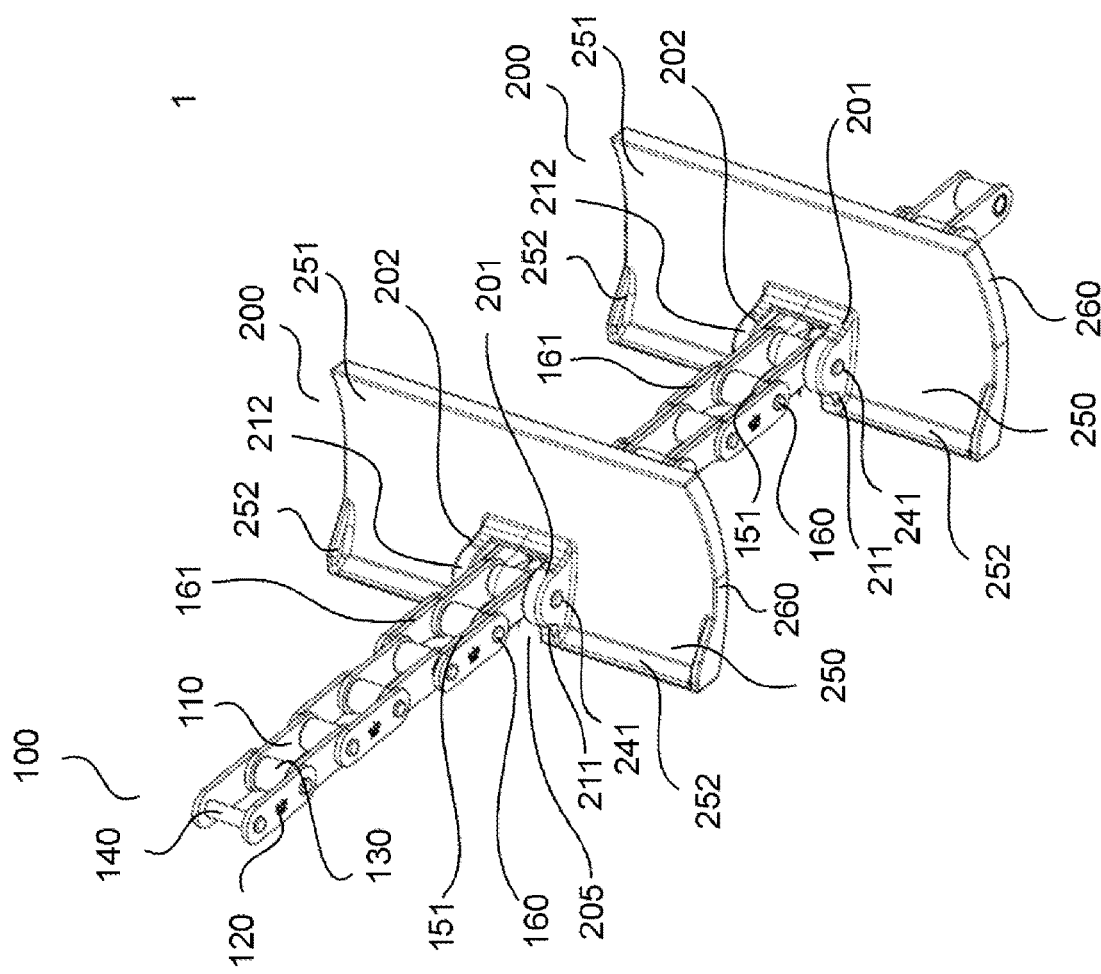

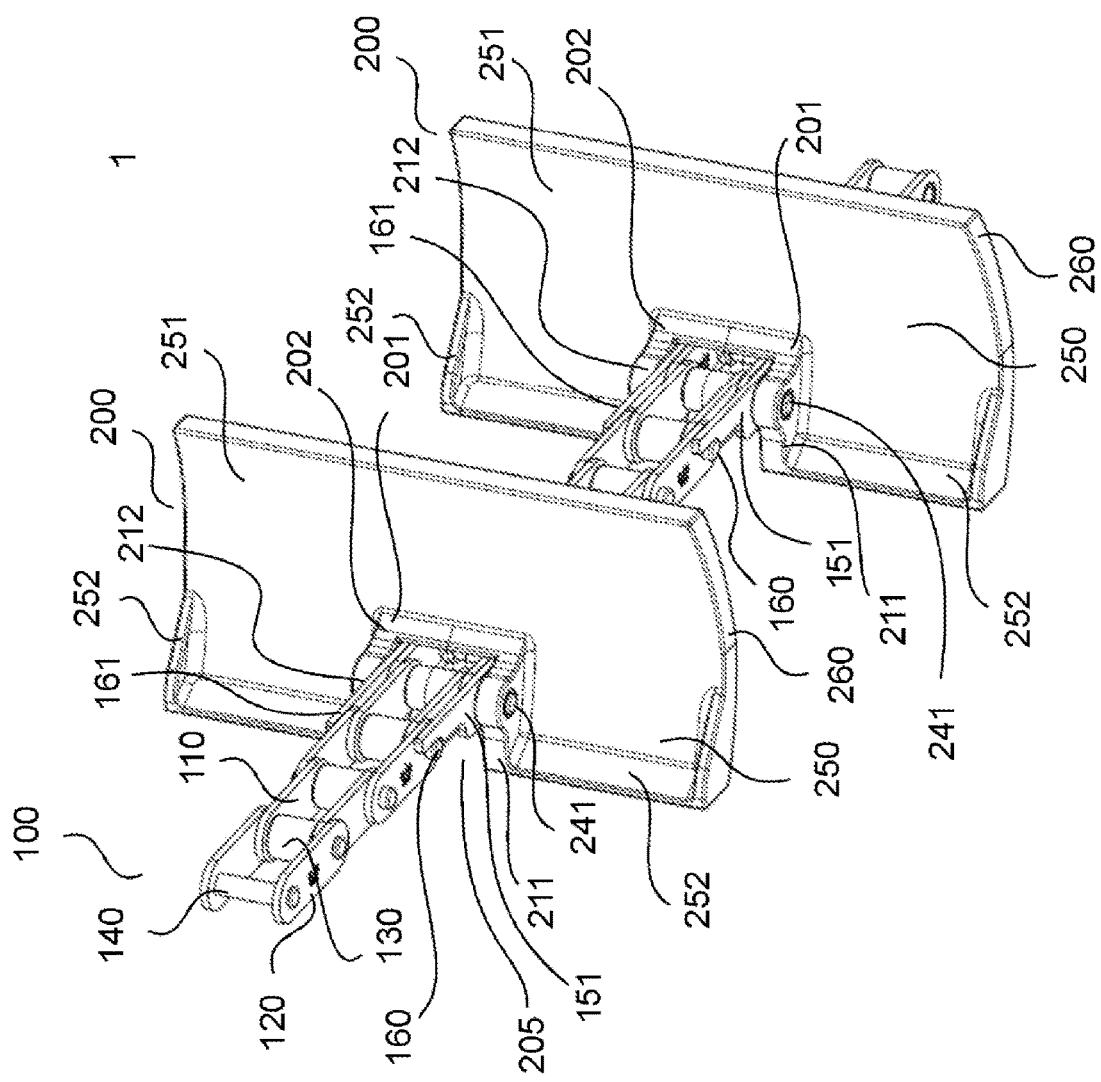

GRAIN CONVEYOR CHAIN

CROSS-REFERENCE TO RELATED APPLICATIONS

This application claims priority to German Patent Application No. 10 2021 112 495.6, filed May 12, 2021, the contents of which are incorporated by reference herein in their entirety.

FIELD

The invention relates to a grain conveyor chain for a harvesting vehicle having a chain made of standard chain elements, wherein the standard chain elements have inner plates, outer plates, pins, and/or sleeves, and a plurality of scoops, wherein the scoops are fastened to the chain and wherein the chain has chain links, which are partially back-rigid, and to a method for operating the grain conveyor chain according to the invention in a harvesting vehicle.

BACKGROUND

Prior Art

Harvesting machines, for example combine harvesters, have conveyor chains, which convey the harvested and threshed material, for example grain, from the screw conveyor in the lower region of the harvesting machine into the grain tank in the upper region of the harvesting machine (also grain conveyor chain or elevator chain). For this purpose, an endless chain provided with scoops runs between two sprockets in an elevator housing, which has a tension-loaded upward section (load strand) and an unloaded return section (empty strand). In addition, conveyor chains are used in the feed region of the header, for example a corn picker.

In operation, the scoops in the upward section of the conveyor chain can tip under the weight of the material being transported, causing the material to roll off the scoop back into the upward section. This reduces the efficiency of the scoop. The unintentional unrolling is increased by the low chain tension. The chain can then slide along the wall of the elevator housing and is thus exposed to increased wear and cause higher energy consumption due to friction.

A chain of this type must therefore be under a minimum tension in order to reduce or minimize unintentional unrolling of the transported material. This can be achieved, for example, by a high speed of the chain, which can lead to unnecessarily increased wear on the chain. The chain sleeves and pins of the chain are also subject to increased wear due to the deflection of the scoop.

US 2018/0334329 A1 discloses a grain conveyor chain having a conveyor scoop. The scoop is fastened on a bracket, which is in turn fastened on a chain outer element of the conveyor chain. In addition, a plastic guide is attached to the bracket. During operation, the plastic guide slides on the partition wall of the elevator housing and thus prevents the scoop from tipping over. However, such a guide on a wall of the elevator housing increases the friction and thus the energy required for operating the conveyor chain, the plastic guide is subject to wear during operation and must therefore be replaced at regular intervals. In addition, a wall is necessary for the operation in the immediate vicinity of the grain conveyor chain, on which the plastic guide can slide. A harvester design that is designed to use the present grain conveyor chain must take this into account.

U.S. Pat. No. 10,462,973 B2 also discloses a grain conveyor chain, the conveyor scoop of which is also fastened on a bracket. The bracket is fastened on a chain outer element of the conveyor chain. The bracket features an angle brace that is supported under load by the chain itself, preventing the scoop from tipping over.

Both grain conveyor chains described here have the disadvantage that in addition to the conveyor scoop, an additional element (the bracket) is required for fastening the conveyor scoop on the chain. This increases the weight of the conveyor chain, which leads to increased energy consumption during operation.

SUMMARY

The object of the invention is therefore to provide a grain conveyor chain for a harvesting vehicle, which allows a higher conveyed quantity of harvested grain per unit of time, which is also cost-effective and operates reliably in use, can be manufactured cost-effectively, and is easy to service in case of damage. It is also an object of the invention to provide a method for operating a conveyor chain for a harvesting vehicle, with which a grain conveyor chain can be operated more efficiently than before and which has longer maintenance intervals.

The object is achieved by means of the grain conveyor chain according to the invention for a harvesting vehicle. Advantageous embodiments of the invention are set out in the dependent claims.

The grain conveyor chain, also called elevator chain, has a chain. The chain has standard chain elements, wherein the standard chain elements have inner plates, outer plates, pins, and/or sleeves. The grain conveyor chain also has multiple scoops fastened on the chain. According to the invention, the chain has chain links that are partially back-rigid, that is, they are flexible on one side. In an optional embodiment the back-rigid chain links are arranged in particular in the region of the scoops in such a way that the scoop is prevented from tipping over.

The chain is a closed, circulating endless chain that is guided over at least two sprockets, at least one of which drives the chain. The rigid chain links of the chain are designed in such a way that the chain is flexible in the region of the rigid chain links in the direction in which it is guided around the sprockets, but does not kink in the opposite direction. The partial implementation of back-rigid chain links in the region of the scoops provides a simple, inexpensive and at the same time effective chain that effectively prevents the scoops from tipping under load.

In the context of the description of the present invention, the term "partially back-rigid" means that the chain has chain links that are partially back-rigid and has chain links that are not back-rigid. A chain with partially back-rigid links has links, which are back-rigid, and links, which are not back-rigid. A back-rigid link of a chain with partially back-rigid links has back-rigid links which may have back-rigid links or non-back-rigid links in their direct neighborhood.

In a further development of the invention, the chain has back-rigid chain links at regular intervals. The rigid-back chain links are located in the region around the scoops, which are themselves spaced at regular intervals along the chain.

In a further development of the invention, the chain has back-rigid chain links at regular intervals to the scoops. The back-rigid chain links are arranged around a defined region around each scoop attached to the chain. The region extends to at least one chain link, which is arranged at the same distance from the scoop for each scoop.

In a further embodiment of the invention, the chain link below each scoop is designed with a rigid back. The term "below the scoop" is defined in this document such that the back-rigid chain link is arranged in the upward section (load strand) of the chain subjected to tensile loads below the scoop, which has to be prevented from tipping under load. The scoop loaded in the upward section of the chain exerts a force on the side of the back-rigid chain link that is not flexible. This prevents the scoop from tipping over under load.

In a further development of the invention, the two chain links directly below each scoop are designed with a rigid back. In the tension-loaded upward section (load strand) of the chain, the two chain links directly below each scoop are designed with a rigid back. The loaded scoop in the upward section of the chain exerts a force on the side of the back-rigid chain link that is not flexible. The first back-rigid chain link directly below the scoop applies a force to the second back-rigid chain link located directly below the first back-rigid chain link such that the scoop is prevented from tipping under load.

In a further embodiment of the invention, the chain links are formed with a rigid back by means of additional chain elements. The additional chain elements can be, for example, additional components which are arranged on the back of the chain links in such a way that they prevent the chain links from buckling in the direction of the back of the chain links.

In a further embodiment of the invention, the additional chain element is an additional plate. The additional plate is usually arranged as an additional outer plate on an outer plate designed as a standard chain element and is connected to standard chain elements via contact surfaces in such a way that it generates the back-rigidity of the chain links.

In a further development of the invention, the additional plate can be brought into engagement with a pin of the chain in order to form the back-rigid chain link. The additional plate is engaged with a pin such that the additional plate prevents pivoting of the pin in one direction—the direction of back-rigidness. The pin does not end with the outer plate of the chain, but protrudes to allow the additional plate to engage.

In a further development of the invention, the additional plate can be brought into engagement with a pin of the chain in order to form the back-rigid chain link. The additional plate is shaped and arranged in such a way that it encloses an inner plate or preferably an outer plate on one side and prevents the plate from pivoting in one direction.

In a further development of the invention, the additional plate can be brought into engagement with a pin of the chain in order to form the back-rigid chain link. The rigidity of the back is produced by a suitable contour of the contact surfaces of the additional plates that are in engagement.

In a development of the invention, the additional chain element replaces a standard chain element. The additional chain element thus replaces a standard chain element, which can be an inner plate and/or an outer plate. This advantageous embodiment of the invention does not increase the weight of the grain conveyor chain according to the invention, and the rigidity of the back can be achieved with simple means.

In an advantageous embodiment of the invention, all of the chain links of the chain are designed to have a rigid back. This is advantageously achieved in that all inner plates and/or all outer plates are designed as rigidifying plates with an abutment contour of the contact surfaces. The abutment contour of a rigidifying plate is supported on the abutment contours of the two directly adjacent rigidifying plates in such a way that the chain is designed with a completely rigid back.

The object is also achieved by means of the method for operating a grain conveyor chain of an agricultural machine. Additional advantageous embodiments of the invention are set out in the dependent claims.

The method according to the invention for operating a grain conveyor chain of an agricultural machine has two steps: In the first step, a scoop attached to the grain conveyor chain is loaded. The grain conveyor chain has a chain and a plurality of scoops. The chain is a closed, circulating endless chain that is guided over at least two sprockets, at least one of which drives the chain. The chain runs in an elevator housing, which has a tension-loaded upward section (load strand) and an unloaded return section (empty strand). In the second step, a first additional chain element of the chain is brought into abutment with another standard chain element of the chain and/or a second additional chain element of the same type of chain.

According to the invention, the first additional chain element is brought into abutment with the further standard chain element and/or the second additional chain element of the same type of chain by the loading of the scoop. The loading of the scoop results in a torque that is essentially perpendicular to the longitudinal axis of the chain. This can cause the scoop to tip over and the transported material can roll off the scoop. By bringing the additional chain element into abutment with another chain element, the torque is compensated and the scoop does not tilt.

For purposes of this invention, an additional chain element is a chain element that differs from a standard chain element of a non-back-rigid chain and restricts the freedom of movement of the chain beyond the freedom of movement the chain would have without this additional chain element. An additional chain element can be built into the chain as a replacement for a standard chain element or mounted in addition to the standard chain elements.

In a further development of the invention, the additional chain element is brought into abutment with the further standard chain element and/or the second additional chain element of the chain by positive locking. The chain elements therefore contact each other, which prevents the scoop from tipping over.

In a further embodiment of the invention, the chain is rigidified by the additional chain element in abutment with the further standard chain element and/or the second additional chain element. The partial implementation of back-rigid chain links provides a simple, inexpensive and at the same time effective chain that effectively prevents the scoops from tipping under load.

In a further embodiment of the invention, an additional chain element is brought into abutment with a further standard chain element of the chain when loading a scoop of the grain conveyor chain. Every load on the grain conveyor chain leads to a local rigidity of the grain conveyor chain. The chain is not fully back-rigid, but only in the region where the scoop exerts a torque perpendicular to the chain under load. A cost-effective chain is thus provided which nevertheless effectively prevents the scoop from tipping over under load.

In a further embodiment of the invention, the additional chain elements, which are each brought into abutment with a further standard chain element and/or further additional chain elements of the same type, are arranged at equal distances from the scoops. The additional chain elements are preferably the first chain links directly above and directly below the scoop. It is also possible to design the first two chain links directly above and directly below the scoop with a rigid back. This results in a local rigidity of the chain.

In a further embodiment of the invention, the chain is rigidified only locally by the additional chain elements, which are each brought into abutment with another standard chain element and/or other additional chain elements of the same type. The chain is not designed to be completely back-rigid, but preferably only the first two chain links directly above and directly below the scoop, thus in the region in which the scoop exerts a torque perpendicular to the chain under load. A cost-effective chain is thus provided which nevertheless effectively prevents the scoop from tipping over under load.

In a development of the invention, the grain conveyor chain is locally rigidified equidistantly from the scoops. Preferably, only the first two chain links are rigidified directly above and directly below the scoop, thus in the region in which the scoop exerts a torque perpendicular to the chain under load. This region is selected to be the same for each scoop arranged on the chain, because the scoops are usually of the same design, which means that the torque of the scoops is the same under load.

In a particularly advantageous embodiment of the invention, a tipping movement of the scoop due to the load is reduced by rigidifying the grain conveyor chain. The back-rigid chain links of the chain are designed in such a way that the chain is flexible in the region of the back-rigid chain links in the direction in which the chain is guided around the sprockets, but does not kink in the opposite direction.

BRIEF DESCRIPTION OF THE DRAWINGS

Exemplary embodiments of the grain conveyor chain according to the invention and of the method according to the invention for operating a grain conveyor chain are shown schematically in simplified form in the drawings and are explained in more detail in the following description.

In particular:

FIG. 2a is a perspective view of a further exemplary embodiment of the grain conveyor chain according to the invention.

FIG. 3a is a perspective view of a third exemplary embodiment of the grain conveyor chain according to the invention

DETAILED DESCRIPTION

Figure 1A:
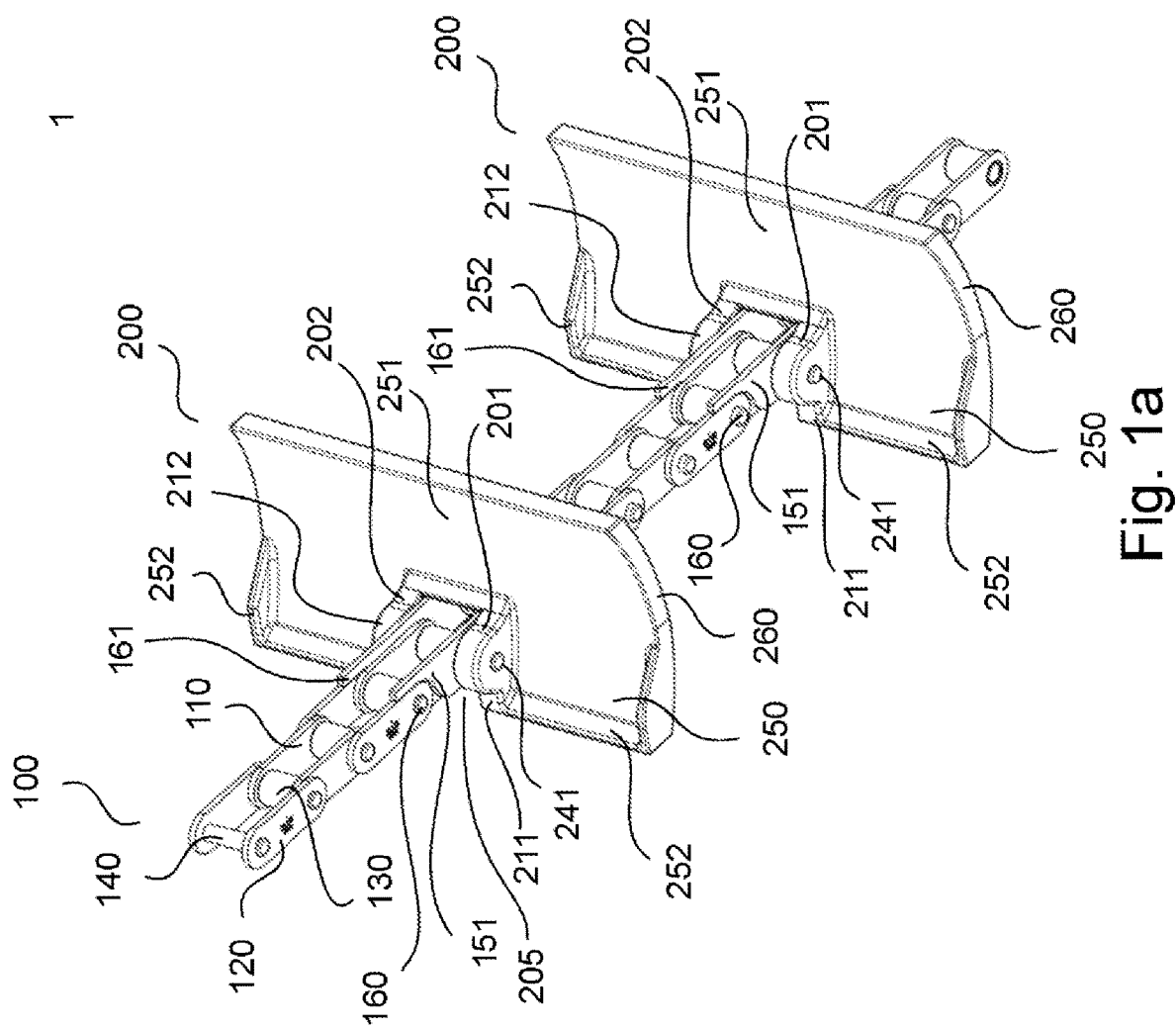
FIG. 1a is a perspective view of the grain conveyor chain according to the invention

FIG. 1 shows an exemplary embodiment of the grain conveyor chain 1 according to the invention. The grain conveyor chain 1 is typically a circulating endless chain, in this and the following figures only one region of the grain conveyor chain 1 being shown. The grain conveyor chain 1 has the chain 100. In this and the following exemplary embodiments, the chain 100 is designed as a roller chain having standard chain elements. The standard chain elements have alternating inner 110 and outer plates 120, which are connected to one another by chain pins 140 guided in chain sleeves. The rotatable rollers 130 enclose the chain sleeves and chain pins 140 and are operatively connected to the drive means, for example a sprocket (not shown).

Figure 1B:
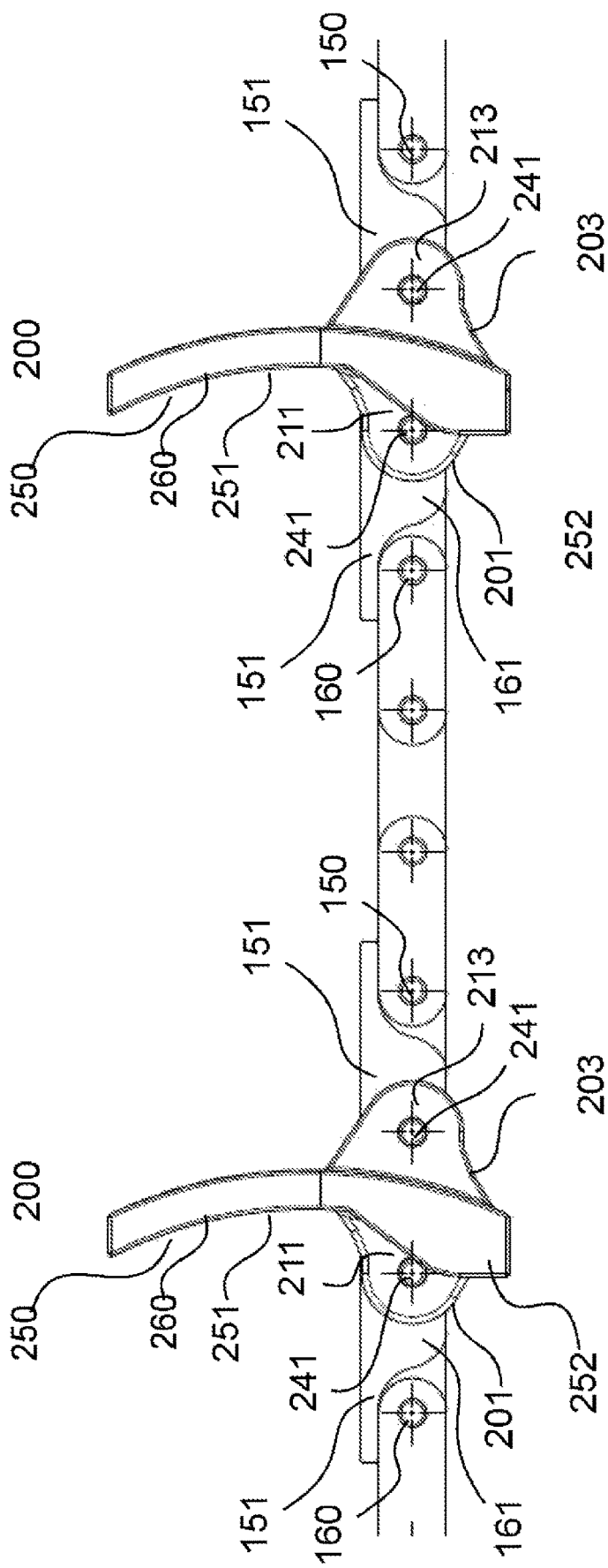
FIG. 1b is a side view of the grain conveyor chain according to the invention
Figure 1C:
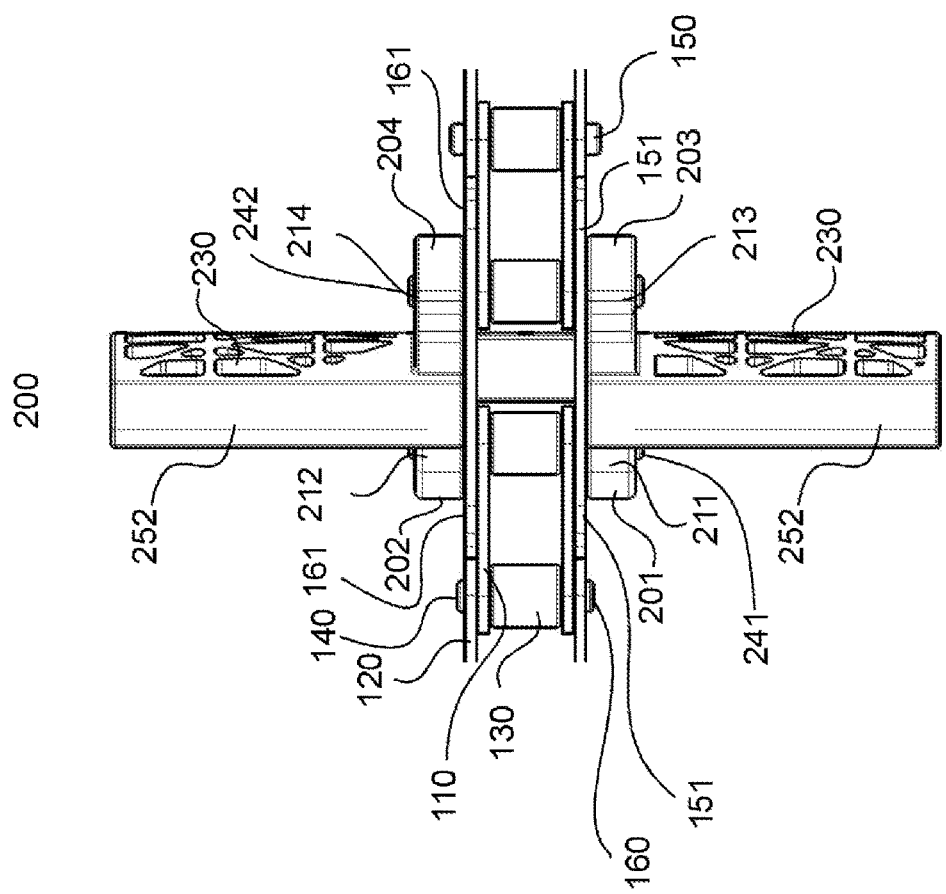
FIG. 1c is a plan view of a grain conveyor chain according to the invention

A plurality of scoops 200 are fastened on the chain 100, wherein two scoops 200 are fastened on the chain spaced apart from one another in FIGS. 1a, b and a scoop 200 is fastened on the chain 100 in FIG. 1c. Each scoop 200 is rectangular in shape and has a scoop surface 250 on the upper side of the scoop body 260 for transporting the grain or other material. The scoop surface 250 has a depression 251 for better transport of the material. In the rear region, the scoop 200 has an edge 252 which prevents the transported material from falling off. At the same time, the edge 252 increases the structural integrity of the scoop 200.

The scoop body 260 is preferably made of a material producible in large quantities, for example a polymer. A recess 205 is also arranged in the middle in the rear region. The recess 205 is dimensioned in such a way that it encloses the chain 100 when installed on the chain 100. The flanks 201, 202, which have the fastening elements 211, 212 aligned with one another, are arranged around the recess 205 on the upper side. Flanks 203, 204 are arranged on the underside with fastening elements 213, 214, which are also aligned with one another. The scoop 200 has a second scoop surface reinforcement 230 on the lower side (FIG. 1c). This second scoop surface reinforcement 230 is designed as a support structure and effectively prevents deformation of the scoop 200 under load.

The scoop 200 is fastened on the chain 100, in such a way that the fastening elements 211, 212 are aligned with a further chain sleeve 130 and the fastening elements 213, 214 are aligned with another chain sleeve 130. A first pin 241 is guided through the fastening elements 211, 212 and the chain sleeve 130, a second pin 242 is guided through the fastening elements 213, 214. Thus, two pins 241, 242 fasten the scoop 200 directly on the chain 100, both pins 241, 242 are at the same time chain pins of the chain 100.

In this exemplary embodiment, the chain 100 has two chain links 150, 160 at regular intervals, which are designed to be back-rigid. The first back-rigid chain link 150 is arranged directly below the scoop 200, and the second back-rigid chain link 160 is arranged directly above (in the upward section of the chain 100) the scoop 200. The back-rigid chain links 150, 160 each have an additional plate 151, 161 which, when the chain 100 is stretched, engages in the upward section with an outer plate 120 designed as a standard chain element, thus reducing the freedom of movement in the respective chain link 150, 160 compared to a standard chain.

During operation, the scoop 200 attached to the chain 100 is loaded by its own weight and the weight of the material being transported on the scoop surface 250. As a result of the load, the additional chain elements 151, 161 are brought into a form-fitting abutment with an external plate 120 designed as a standard chain element. The load of the scoop 200 acts on the chain 100 in the direction in which the back-rigid chain 100 is back-rigid, that is, opposite to the direction in which the chain 100 is flexible. The local rigidifying around the additional chain elements 150, 160 effectively prevents the scoop 200 from tipping over.

Figure 2B:
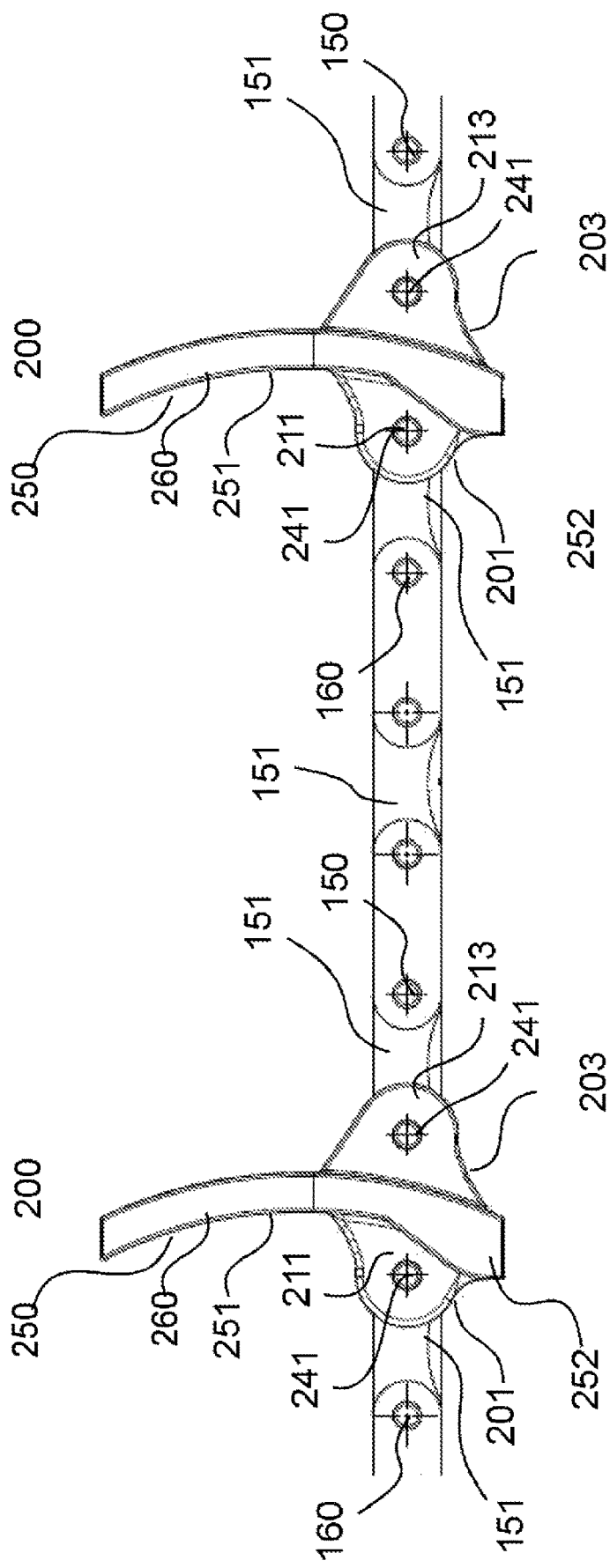
FIG. 2b is a side view of a further exemplary embodiment of the grain conveyor chain according to the invention
Figure 2C:
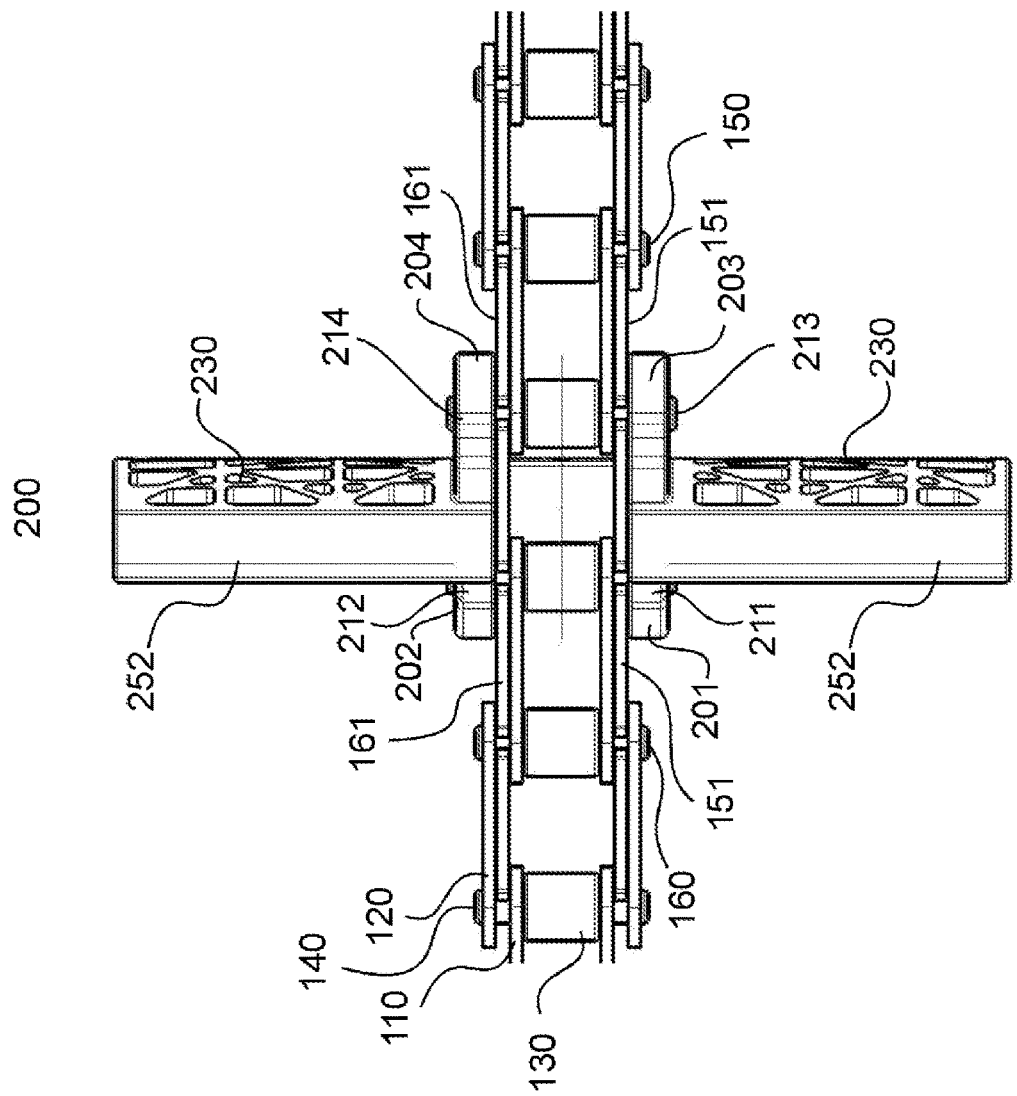
FIG. 2c is a plan view of a further exemplary embodiment of the grain conveyor chain according to the invention

An exemplary embodiment of the grain conveyor chain 1 according to the invention, in which all inner chain link elements 110 are designed to be back-rigid, is shown in FIG. 2. The chain 100 shown in this exemplary embodiment has inner plates 110 and outer plates 120, which are connected to each other by chain pins 140 guided in chain sleeves 130 (FIG. 2*a*). In this exemplary embodiment, the inner plates 110 are advantageously of identical construction (FIG. 2*b*). The chain 100 can therefore be manufactured very inexpensively in a manufacturing process, for example by stamping a large number of identical components. The rigidity of the back of the chain 100 is achieved by a geometric abutment contour of the inner plates 110. An inner plate 110 forms a positive connection with two adjacent inner plates 110 (FIG. 2*c*). The chain 100 is therefore designed to be completely back-rigid and prevents the scoop 200 from tipping over under load.

Figure 3B:
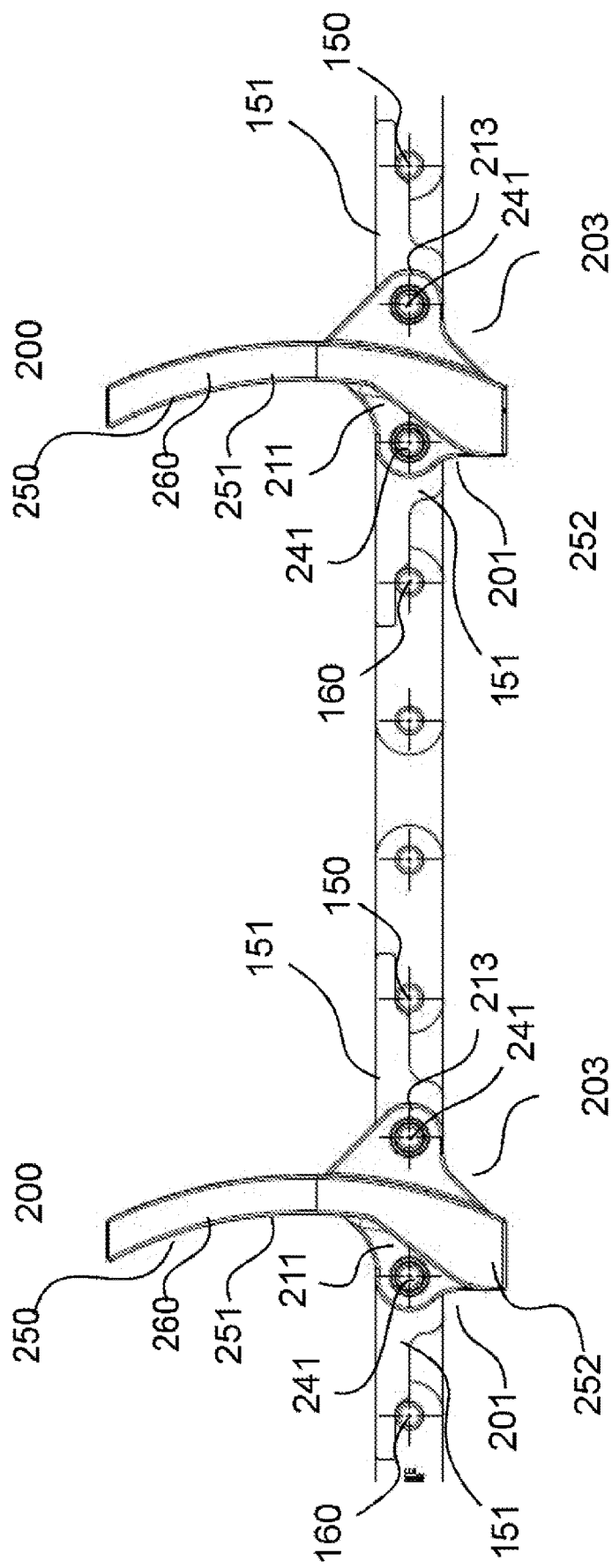
FIG. 3b is a side view of a third exemplary embodiment of the grain conveyor chain according to the invention
Figure 3C:
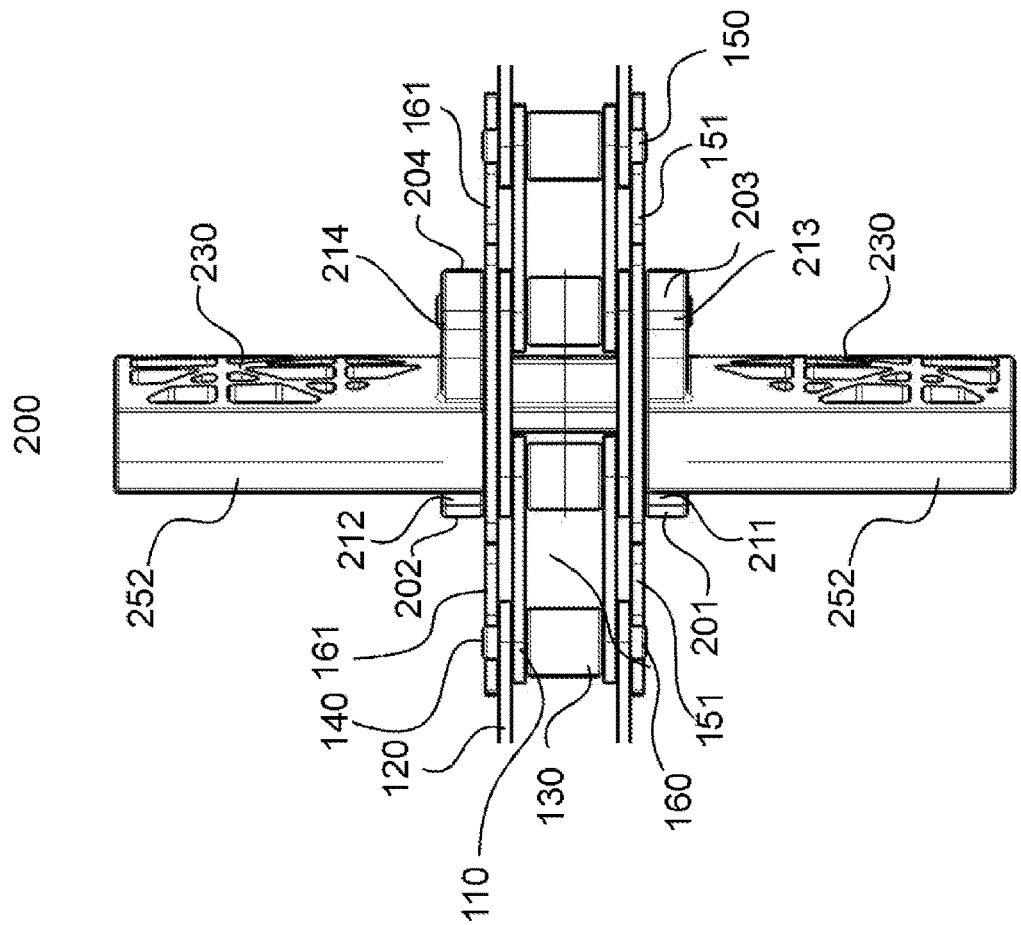
FIG. 3c is a plan view of a third exemplary embodiment of the grain conveyor chain according to the invention

FIG. 3 shows a variant of the grain conveyor chain 1 according to the invention, as shown in the first embodiment (see FIGS. 1*a-c*). In this exemplary embodiment, the chain 100 has two chain links 150, 160, also at regular intervals, which are designed to be back-rigid. The first back-rigid chain link 150 is arranged directly below the scoop 200, and the second back-rigid chain link 160 is arranged directly above the scoop 200. The two back-rigid chain links 150, 160, above and below the scoop 200 respectively, have an additional plate 151, 161 which, when the chain 100 is in the stretched state, respectively engages with a chain pin 140 in the upward section. The additional plate is designed in one piece and is arranged on both sides of the chain. The local rigidifying around the additional chain elements 151, 161 prevents the scoop 200 from tipping under load.

LIST OF REFERENCE NUMERALS

1 grain conveyor chain
100 chain
110 chain inner plate
120 chain outer plate
130 roller
140 chain pin
150 back-rigid chain link below the scoop
151, 161 additional plate
160 back-rigid chain link above the scoop
200 scoop
201, 202 flank upper side
203, 204 flank lower side
205 recess
211, 212, 213, 214 fastening elements
230 reinforcement of the scoop surface
241, 242 fastening pins
250 scoop surface
251 depression
252 elevation
260 scoop body

We claim:

1. A grain conveyor chain for a harvesting vehicle, comprising:
    a chain having standard chain elements,
        wherein the standard chain elements have inner plates, outer plates, pins, and/or sleeves, and
    a plurality of scoops wherein the scoops are fastened on the chain,
        wherein the chain has chain links which are partially designed to be back-rigid,
        wherein,
        the chain links are designed to be back-rigid by using additional chain elements,
        the additional chain element is an additional plate, and
        the additional chain element replaces a standard chain element.

2. The grain conveyor chain for a harvesting vehicle according to claim 1, wherein
    the chain has back-rigid chain links at regular intervals.

3. The grain conveyor chain for a harvesting vehicle according to claim 1, wherein
    the chain has back-rigid chain links at regular intervals relative to the scoops.

4. The grain conveyor chain for a harvesting vehicle according to claim 3, wherein
    the chain link below and/or above each scoop is designed to be back-rigid.

5. The grain conveyor chain for a harvesting vehicle according to claim 3, wherein
    the two chain links immediately below and/or above each scoop are designed to be back-rigid.

6. The grain conveyor chain for a harvesting vehicle according to claim 1, wherein
    the additional plate can be brought into engagement with a pin of the chain to form the back-rigid chain link.

7. The grain conveyor chain for a harvesting vehicle according to claim 1, wherein
    the additional plate can be brought into engagement with a plate of the chain to form the back-rigid chain link.

8. The grain conveyor chain for a harvesting vehicle according to claim 1, wherein
    the additional plate can be brought into engagement with a further additional plate of the chain to form the back-rigid chain link.

9. The grain conveyor chain for a harvesting vehicle according to claim 1, wherein
    all chain links of the chain are designed to be back-rigid.

10. A method for operating a grain conveyor chain of an agricultural machine, the grain conveyor chain comprising a chain and a plurality of scoops, the method comprising:
    loading a scoop attached to the grain conveyor chain,
    bringing a first additional chain element of the chain into abutment with a further standard chain element of the chain and/or a second additional chain element of the same type of the chain, and
    preventing the scoop from tipping over with back-rigid chain links arranged in the region of the scoops,
        wherein the first additional chain element is brought into abutment with the further standard chain element and/or the second additional chain element by the loading of the scoop,
    wherein
        the first additional chain element and/or the second additional chain element is brought into form fitting abutment with the further standard chain element and/or the second additional chain element of the chain.

11. The method for operating a grain conveyor chain of an agricultural machine according to claim 10, wherein
    the chain is rigidified by the additional chain element abutting with the further standard chain element and/or the second additional chain element.

12. The method for operating a grain conveyor chain of an agricultural machine according to claim 11, wherein
    each time a scoop of the grain conveyor chain is loaded, an additional chain element is brought into abutment with a further standard chain element of the chain, wherein each load on a scoop of the grain conveyor chain leads to a local rigidifying of the chain.

13. The method for operating a grain conveyor chain of an agricultural machine according to claim 12, wherein
the additional chain elements, which are respectively brought into abutment with a further standard chain element and/or further additional chain elements, are arranged at equal distances from the scoops.

14. The method for operating a grain conveyor chain of an agricultural machine according to claim 10, wherein
the rigidifying of the chain by the additional chain elements, which are respectively brought into abutment with a further standard chain element and/or further additional chain elements of the same type, takes place only locally.

15. The method for operating a grain conveyor chain of an agricultural machine according to claim 14, wherein
the local rigid locations of the chain are equidistant to the scoops.

16. The method for operating a grain conveyor chain of an agricultural machine according to claim 10, wherein
by rigidifying the chain, a tipping movement of the scoop (200) caused by the load is reduced.

* * * * *